(12) United States Patent
Major et al.

(10) Patent No.: US 8,740,103 B2
(45) Date of Patent: Jun. 3, 2014

(54) HEATER COOLANT FLOW CONTROL FOR HVAC MODULE

(75) Inventors: Gregory A. Major, Farmington Hills, MI (US); Edwin J. Stanke, Pontiac, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 978 days.

(21) Appl. No.: 12/106,455

(22) Filed: Apr. 21, 2008

(65) Prior Publication Data

US 2009/0261176 A1 Oct. 22, 2009

(51) Int. Cl.
*B60H 1/04* (2006.01)
*B60H 3/00* (2006.01)

(52) U.S. Cl.
USPC ........... 237/12.3 B; 165/202; 165/42; 165/43; 454/156

(58) Field of Classification Search
USPC ........... 237/12.3 B; 165/202, 42, 43; 454/156
See application file for complete search history.

(56) References Cited

U.S. PATENT DOCUMENTS

| | | | | |
|---|---|---|---|---|
| 2,801,802 A * | 8/1957 | Jackson | ..................... | 237/8 A |
| 4,058,255 A * | 11/1977 | Linder et al. | ............. | 237/12.3 B |
| 4,548,355 A * | 10/1985 | Stolz et al. | ..................... | 236/37 |
| 4,930,455 A * | 6/1990 | Creed et al. | ................... | 123/41.1 |
| 4,949,779 A | 8/1990 | Kenny et al. | | |
| 5,105,730 A * | 4/1992 | Smith | ......................... | 454/161 |
| 5,180,004 A * | 1/1993 | Nguyen | ......................... | 165/140 |
| 5,277,038 A * | 1/1994 | Carr | ................................. | 62/434 |
| 5,678,760 A * | 10/1997 | Muso et al. | ..................... | 237/2 A |
| 5,779,141 A * | 7/1998 | Okumura et al. | ................. | 236/36 |
| 6,047,770 A * | 4/2000 | Suzuki et al. | ..................... | 165/202 |
| 6,112,543 A * | 9/2000 | Feuerecker et al. | ............. | 62/430 |
| 6,237,357 B1 * | 5/2001 | Hirao et al. | ...................... | 62/325 |
| 6,269,872 B1 * | 8/2001 | Anderson | ..................... | 165/271 |
| 6,425,818 B1 * | 7/2002 | Auvity et al. | .................. | 454/121 |
| 6,454,180 B2 * | 9/2002 | Matsunaga et al. | ...... | 237/12.3 B |
| 6,598,671 B1 * | 7/2003 | Zeng et al. | ..................... | 165/240 |
| 6,751,966 B2 * | 6/2004 | Viegas et al. | ..................... | 62/131 |

(Continued)

FOREIGN PATENT DOCUMENTS

| | | |
|---|---|---|
| CN | 2125519 U | 12/1992 |
| CN | 1339366 A | 3/2002 |

(Continued)

OTHER PUBLICATIONS

Lindeburg, Michael R., Mechanical Engineering Reference Manual, 1990, Professional Publications, Inc., Eighth Edition, pp. 10-5, 10-8.*

(Continued)

*Primary Examiner* — Kang Hu
*Assistant Examiner* — Phillip E Decker

(57) ABSTRACT

An air conditioning system and a method of heating air flowing through a heater core of a HVAC module is disclosed. The method includes flowing essentially all of the air flowing through an evaporator through a heater core for all HVAC operating conditions. A flow control valve is opened long enough to allow a flow of hot coolant from an engine into the heater core. The valve is then closed to stop the flow of the hot coolant. When the temperature of the hot coolant is determined to have cooled to a predetermined temperature threshold, the flow control valve is then opened again to allow hot coolant to flow into the heater core.

11 Claims, 1 Drawing Sheet

(56) References Cited

U.S. PATENT DOCUMENTS

| | | | |
|---|---|---|---|
| 7,028,767 B2 * | 4/2006 | Takano et al. | 165/202 |
| 7,048,044 B2 * | 5/2006 | Ban et al. | 165/202 |
| 7,055,590 B2 * | 6/2006 | Hara | 165/202 |
| 7,063,138 B2 * | 6/2006 | Salim et al. | 165/202 |
| 7,069,983 B2 * | 7/2006 | Yakumaru et al. | 165/202 |
| 7,421,984 B2 * | 9/2008 | Braun et al. | 123/41.29 |
| 2003/0089493 A1 * | 5/2003 | Takano et al. | 165/202 |
| 2004/0011306 A1 * | 1/2004 | Liederman et al. | 123/41.12 |
| 2004/0016411 A1 * | 1/2004 | Joyce et al. | 123/41.1 |
| 2004/0231824 A1 * | 11/2004 | Paolillo et al. | 165/11.1 |
| 2005/0263275 A1 * | 12/2005 | Salim et al. | 165/202 |
| 2006/0157576 A1 | 7/2006 | Eisenhour | |
| 2007/0028862 A1 * | 2/2007 | Braun et al. | 123/41.1 |
| 2007/0084596 A1 * | 4/2007 | Umehara | 165/202 |
| 2008/0245504 A1 * | 10/2008 | Eisenhour | 165/43 |

FOREIGN PATENT DOCUMENTS

| | | | | |
|---|---|---|---|---|
| DE | 102007024891 A1 | 12/2007 | | |
| FR | 2503260 | * | 10/1982 | F01M 5/02 |
| FR | 2503260 A | * | 10/1982 | |
| JP | 59145617 A | | 8/1984 | |

OTHER PUBLICATIONS

Lindeburg, Michael R., Mechanical Engineering Reference Manual, 1990, Professional Publications, Inc., Eighth Edition, p. 10-8.*
Lindeburg, Michael R., Mechanical Engineering Reference Manual, 1990, Professional Publications, Inc., Eighth Edition, p. 10-5.*
Lindeburg, Mechanical Engineering Reference Manual, Eighth Ed., Professional Publications, 1990, p. 10-5.*
Lindeburg, Mechanical Engineering Reference Manual, Eighth Ed., Professional Publications, 1990, p. 10-8.*

* cited by examiner

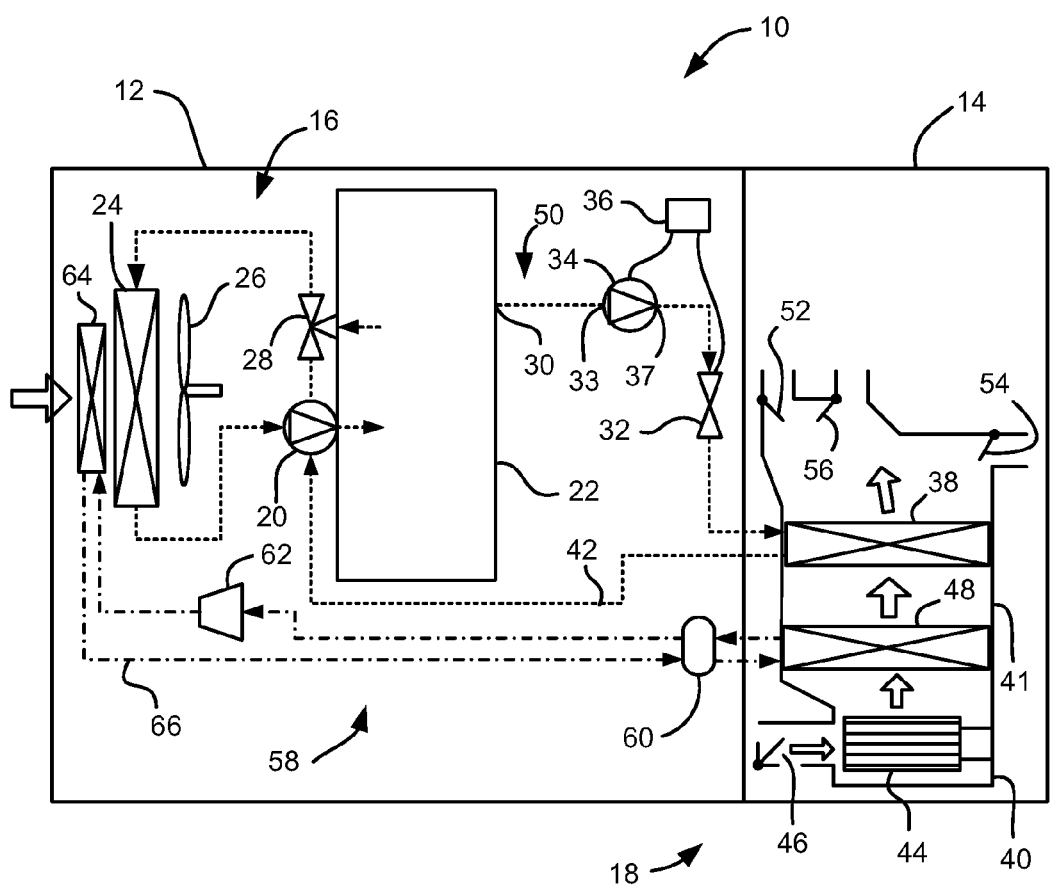

HEATER COOLANT FLOW CONTROL FOR HVAC MODULE

BACKGROUND OF INVENTION

The present invention relates generally to heating, ventilation and air conditioning (HVAC) systems for vehicles, and in particular to heating the air in such HVAC systems.

In a conventional HVAC module, an air temperature door (blend door) is used to direct the flow of air through or around the heater core after the air flows through the evaporator, and a mixing chamber is located downstream of the heater core to allow the air to flow through the heater core to mix with the air that flows around the heater core. This allows for a uniform temperature of the air flowing from the HVAC module by mixing the cooler air that flowed around the heater core with the warmer air that flowed through the heater core. However, with these conventional systems, the HVAC module may be larger than is desired due to the space needed for the blend door and the mixing chamber, and moreover the hot coolant is being continuously pumped through the heater core, whether needed or not.

Some have added a valve to stop the flow of coolant through the heater core when not needed. Others have employed a pump having pulse width modulation or on/off control in order to control the percentage of maximum coolant flow flowing through the heater core based on the current heating needs of the HVAC system. The pulsed width modulation is a linear flow control of the flowing coolant, with reduced flow when reduced capacity is needed and higher flow when higher heater capacity is needed. But these variations of the conventional system still do not overcome some of the drawbacks of the conventional HVAC module.

SUMMARY OF INVENTION

An embodiment contemplates a method of heating air flowing through a heater core of a HVAC module. The method may comprise the steps of: flowing air through an evaporator of the HVAC module; flowing essentially all of the air flowing through the evaporator through a heater core for all HVAC operating conditions; opening a valve to cause a flow of hot coolant from an engine into the heater core long enough to replace coolant in the heater core with the hot coolant from the engine; closing the valve to stop the flow of the hot coolant into the heater core when the hot coolant has replaced the coolant in the heater core; determining a temperature of the hot coolant; and refilling the heater core with hot coolant when the temperature of the hot coolant is determined to have cooled to a predetermined temperature threshold.

An embodiment contemplates an HVAC system for a vehicle. The HVAC system may comprise a HVAC module, a heater core coolant loop and a flow control valve. The HVAC module may include a blower, an evaporator downstream in an air flow stream from the blower, and a heater core located adjacent to and downstream in the air flow stream from the evaporator, the evaporator having a face area and the heater core having a face area that is essentially equal to the face area of the evaporator, and a HVAC housing containing the evaporator and the heater core and configured to always direct all of the air flow stream flowing through the evaporator through the heater core. The heater core coolant loop is configured to direct coolant from an engine to the heater core and back to the engine. The flow control valve is located in the heater core coolant loop and configured to selectively stop a flow of the coolant in the heater core coolant loop.

An advantage of an embodiment is that controlling the periodic flow of coolant into the heater core allows for desired air temperature control, even if all of the air flow through the evaporator also flows through the heater core. This allows for the elimination of a blend door. The rapid flooding and stopping of flow also creates a relatively uniform temperature across the face of the heater core, thus eliminating the need for a mixing chamber downstream of the heater core. The elimination of a blend door and mixing chamber reduces the size and simplifies the packaging of the HVAC module in a vehicle. This may be particularly advantageous in small cars that have minimal room for the HVAC module.

BRIEF DESCRIPTION OF DRAWINGS

The FIGURE is a schematic illustration of a vehicle and an HVAC system for the vehicle.

DETAILED DESCRIPTION

Referring to FIG. 1, a vehicle, indicated generally at 10, is shown. The vehicle 10 includes an engine compartment 12 and a passenger compartment 14. Within the compartments 12, 14 are an engine cooling system 16 and a heating, ventilation and air conditioning (HVAC) system 18.

The engine cooling system 16 includes a water pump 20 that pushes water through an engine 22 and other portions of the engine cooling system 16. This water pump 20 may be driven by the engine 22. A radiator 24 and fan 26 are employed in a conventional fashion for removing heat from the engine coolant. A thermostat 28 is employed in a conventional fashion for selectively blocking the flow of coolant through the radiator 24 when the coolant is below a desired operating temperature.

A heater core outlet 30 from the engine 22 directs coolant to an inlet 33 of an electric flow control pump 34. The flow control pump 34 is optional, depending upon the particular vehicle in which the HVAC system 18 is employed. For example, the flow control pump 34 may be needed as a supplemental pump if the engine driven water pump 20 does not create sufficient flow to fill a heater core 38 fast enough with hot coolant (discussed below). An outlet 37 of the flow control pump 34 directs fluid to an electronically controlled flow control valve 32. A controller 36 connects to and controls the operation of the flow control pump 34 and the flow control valve 32. This controller 36 may be separate or may be integrated into another controller, such as an HVAC controller. The valve is an on-off (open-closed) valve that selectively allows the flow of coolant into the heater core 38, located in a HVAC module 40. A coolant line 42 directs coolant from the heater core 38 to an inlet to the water pump 20, completing a heater core coolant loop 50. The dashed lines shown in FIG. 1 represent coolant lines through which engine coolant flows.

The HVAC system 18 includes the HVAC module 40, within which it is located a blower 44 for drawing air in through an air inlet 46 and directing it through an evaporator 48. Downstream of the evaporator 48 is the heater core 38. The heater core 38 has a face area essentially equal to the face area of the evaporator 48, with the heater core 38 preferably immediately down stream of the evaporator 48. An HVAC housing 41 is shaped to direct all of the air flowing through the evaporator 48 through the heater core 38—without a heater core bypass flow. This arrangement can be employed since no temperature blend door is needed. Moreover, the mixing chamber downstream of the heater core 38 can be eliminated since all of the air flowing through the evaporator 48 also flows through the heater core 38. The elimination of the room needed for a blend door and mixing chamber allows the HVAC module 40 to be smaller, thus minimizing the packaging space. The HVAC module 40 may also include a defrost outlet and door 52, a floor outlet and door 54, and a panel outlet and door 56, which direct air into different portions of the passenger compartment 14.

A refrigerant portion 58 of the HVAC system 18 may include the evaporator 48, a thermal expansion valve 60, a refrigerant compressor 62, and a condenser 64 connected together in a conventional fashion via refrigerant lines 66. The compressor 62 may be driven by the engine 22 in a conventional fashion or by an electric motor, if so desired. The dash-dot lines shown in FIG. 1 represent refrigerant lines through which refrigerant flows.

Filling the refrigerant portion 58 with refrigerant and the engine cooling system 16 with coolant may be accomplished in a conventional fashion.

The operation of the HVAC system 18 will now be discussed. In the HVAC module 40, essentially all of the air flowing through the evaporator 48 also flows through the heater core 38, so periodic flow control of the heater core 38—that is controlling the periodic flow of hot coolant into the heater core 38—is a main factor in controlling the HVAC module outlet air temperature.

In high heat demand situations, after the coolant has been warmed-up by the engine 22, the controller 36 will open the flow control valve 32. The controller 36 controls the flow control valve 32 to regulate the amount of coolant flow—a greater overall flow for more heat transfer from the heater core and a lesser flow to reduce the heat transfer from the heater core. Also, the blower 44 is operated to blow air through the heater core 38. If additional coolant flow is required to meet the high heat demand, the flow control pump 34, if so equipped, is turned on, thus, maximizing the heat transfer into the passenger compartment 14.

At low heater loads, such as after a passenger compartment 14 has already been warmed-up or in air conditioning mode when the compressor 62 is running and cooled air flowing from the evaporator 48 needs to be warmed-up somewhat, the controller 36 will open the flow control valve 32, quickly flooding the heater core 38 with hot coolant. Once enough flow has occurred to replace the coolant in the heater core 38 with the hot coolant, the controller 36 will stop the flow control pump 34 (if operating) and close the flow control valve 32 to stop the flow of coolant into the heater core 38. The blower 44 is operated to blow air through the evaporator 48 and then the heater core 38, where it absorbs heat, before being pushed out through one or more of the vents 52, 54, 56. Upon dropping to a predetermined temperature, which may be a heater core fin temperature, a temperature measurement of coolant in the heater core 38 itself, or some other indicator of the temperature of coolant in the heater core 38 (e.g., an estimated temperature based on blower speed, ambient air temperature and time), the controller 36 will again open the valve 32 and activate the pump 34 and flood the heater core 38 with another batch of hot coolant from the engine 22. After which, again the pump 34 will stop and the valve 32 will be closed. This process, then, is repeated to provide the heat required for the vehicle passenger compartment 14. The blower speed or other parameters of the HVAC module 40 may be adjusted to account for the initial higher temperature of the coolant when a new batch is delivered to the heater core 38.

This rapid flooding and stopping of coolant flow may create a relatively uniform temperature across the face of the heater core 38, with the temperature over the entire face of the heater core 38 changing relatively uniformly as the thermal energy is transferred to the air. Thus the need for any mixing chamber downstream of the heater core 38 is eliminated.

While certain embodiments of the present invention have been described in detail, those familiar with the art to which this invention relates will recognize various alternative designs and embodiments for practicing the invention as defined by the following claims.

What is claimed is:

1. A method of heating air flowing through a heater core of a HVAC module, the method comprising the steps of:
    (a) flowing air through an evaporator of the HVAC module;
    (b) flowing essentially all of the air flowing through the evaporator through a heater core for all HVAC operating conditions;
    (c) opening a flow control valve to cause a flow of heated coolant flowing from and heated by an engine into the heater core long enough to replace coolant in the heater core with the heated coolant from the engine;
    (d) after step (c), closing the flow control valve to stop the flow of the heated coolant into the heater core when the heated coolant has replaced the coolant in the heater core, whereby the air flowing through the heater core absorbs heat from the heated coolant;
    (e) determining a temperature of the heated coolant as the air flows through the heater core absorbing heat from the heated coolant; and
    (f) repeating steps (c) through (e) when the temperature of the heated coolant determined in step (e) is determined to have cooled to a predetermined temperature threshold.

2. The method of claim 1 wherein step (c) is further defined by activating a flow control pump as the flow control valve is opened, and wherein step (d) is further defined by stopping the flow control pump as the flow control valve is closed.

3. The method of claim 1 wherein step (e) is further defined by measuring a fin temperature on the heater core to determine the temperature of the heated coolant.

4. The method of claim 1 wherein step (e) is further defined by determining the temperature of the heated coolant by estimating the temperature of the heated coolant based on a speed of a blower, an ambient air temperature and an amount of time since the heated coolant flowed into the heater core.

5. The method of claim 1 wherein steps (a) and (b) are further defined by a face area of the heater core being essentially equal to a face area of the evaporator.

6. The method of claim 1 including operating a refrigerant compressor, and flowing a cooled refrigerant through the evaporator.

7. A method of heating air flowing through a heater core of a HVAC module, the method comprising the steps of:
    a) flowing air through an evaporator of the HVAC module;
    b) flowing essentially all of the air flowing through the evaporator through a heater core for all HVAC operating conditions;
    c) opening a flow control valve and activating a flow control pump, as the flow control valve is opened, to cause a flow of heated coolant flowing from and heated by an engine into the heater core long enough to replace coolant in the heater core with the heated coolant from the engine;
    d) after step (c), closing the flow control valve and stopping the flow control pump as the flow control valve is closed to stop the flow of the heated coolant into the heater core when the heated coolant has filled the heater core, whereby the air flowing through the heater core absorbs heat from the heated coolant;

e) determining a temperature of the heated coolant as the air flows through the heater core absorbing heat from the heated coolant; and f) repeating steps (c) through (e) when the temperature of the heated coolant determined in step (e) is determined to have cooled to a predetermined temperature threshold.

8. The method of claim 7 wherein step (e) is further defined by measuring a fin temperature on the heater core to determine the temperature of the heated coolant.

9. The method of claim 7 wherein step (e) is further defined by determining the temperature of the heated coolant by estimating the temperature of the heated coolant based on a speed of a blower, an ambient air temperature and an amount of time since the heated coolant flowed into the heater core.

10. The method of claim 7 wherein steps (a) and (b) are further defined by a face area of the heater core being essentially equal to a face area of the evaporator.

11. The method of claim 7 including operating a refrigerant compressor, and flowing a cooled refrigerant through the evaporator.

* * * * *